United States Patent [19]
Ishikawa

[11] Patent Number: 6,082,742
[45] Date of Patent: *Jul. 4, 2000

[54] APPARATUS FOR CONTROLLING TILT OF AXLE FOR INDUSTRIAL VEHICLE, AND APPARATUS AND METHOD FOR ESTIMATING CENTER OF GRAVITY FOR INDUSTRIAL VEHICLE

[75] Inventor: Kazuo Ishikawa, Kariya, Japan

[73] Assignee: Kabushiki Kaisha Toyoda Jidoshokki Seisakusho, Aichi-ken, Japan

[*] Notice: This patent is subject to a terminal disclaimer.

[21] Appl. No.: 09/061,762

[22] Filed: Apr. 16, 1998

[30] Foreign Application Priority Data

Jun. 11, 1997 [JP] Japan ................................ 9-153999

[51] Int. Cl.⁷ ............................. B60G 9/02; B60G 17/005
[52] U.S. Cl. ............................... 280/5.508; 280/124.112; 280/755; 180/290; 701/38; 701/124
[58] Field of Search ...................................... 280/754, 755, 280/124.106, 124.112, 124.113, 124.111, 5.508; 180/290; 701/38, 50, 124

[56] References Cited

U.S. PATENT DOCUMENTS

| | | |
|---|---|---|
| 4,221,530 | 9/1980 | Williams, IV et al. . |
| 4,393,959 | 7/1983 | Acker ........................................ 280/755 |
| 4,511,974 | 4/1985 | Nakane et al. . |
| 4,734,006 | 3/1988 | Krob et al. ........................ 280/124.106 |
| 5,639,119 | 6/1997 | Plate et al. ................................ 280/754 |
| 5,947,516 | 9/1999 | Ishikawa ................................... 280/755 |

FOREIGN PATENT DOCUMENTS

| | | |
|---|---|---|
| 0 465 838 A1 | 1/1992 | European Pat. Off. . |
| 0783 984 A2 | 7/1997 | European Pat. Off. . |
| 30 18 225 A1 | 11/1981 | Germany . |
| 58-167215 | 10/1983 | Japan . |
| 58-211903 | 12/1983 | Japan . |
| 2 264 689 | 9/1993 | United Kingdom . |

*Primary Examiner*—Peter C. English
*Attorney, Agent, or Firm*—Morgan & Finnegan, L.L.P.

[57] ABSTRACT

An apparatus for controlling the tilt of a rear axle of a forklift is disclosed. A locking mechanism, which includes a hydraulic damper and a shutoff valve, locks the rear axle against tilt. A controller determines that a locking condition for locking the rear axle is satisfied when at least one of the centrifugal acceleration acting on the forklift and the rate of change of the yaw rate is equal to or greater than a predetermined determination value. The controller estimates the location of the center of gravity in the fore-and-aft direction of the forklift based on the tilt angle of a forks, the height of the forks and weight of an object on the forks. When determining that the driving force of the drive wheels is not sufficiently transmitted to the road surface based on the estimated location of the center of gravity, the controller does not permit the locking of the rear axle even if the locking condition is satisfied.

20 Claims, 8 Drawing Sheets though the tiltable rear axle causes the body frame to be inclined by centrifugal force when the vehicle is turning. In other words, the tiltable rear axle degrades the stability of the vehicle during turning of the vehicle.

APPARATUS FOR CONTROLLING TILT OF AXLE FOR INDUSTRIAL VEHICLE, AND APPARATUS AND METHOD FOR ESTIMATING CENTER OF GRAVITY FOR INDUSTRIAL VEHICLE

BACKGROUND OF THE INVENTION

The present invention relates to an apparatus for controlling tilt of an axle of industrial vehicles such as forklifts. More particularly, the present invention relates to an apparatus that locks a tiltable axle, which supports wheels, for prohibiting tilt of the axle as necessary. The present invention further relates to an apparatus and a method for estimating the location of the center of gravity in the fore-and-aft direction of an industrial vehicle.

In a typical industrial vehicle such as a forklift, the rear axle, which supports rear wheels, is pivotally secured to the body frame. The rear axle thus tilts with respect to the body frame thereby allowing all of the front and rear wheels to always contact the road surface even if the vehicle runs over bumps and dips. As a result, the vehicle travels in a stable manner. However, the tiltable rear axle causes the body frame to be inclined by centrifugal force when the vehicle is turning. In other words, the tiltable rear axle degrades the stability of the vehicle during turning of the vehicle.

Japanese Unexamined Patent Publication No. 58-211903 describes a forklift that has a mechanism for locking a tiltable axle against tilt. The mechanism locks the tiltable axle to the body frame when detected centrifugal force exceeds a predetermined value. Thus, when a great centrifugal force acts on the forklift, inclination of the body frame is restricted. This stabilizes steerage of the forklift.

Japanese Unexamined Patent Publication No. 58-167215 also describes a forklift that has a mechanism for locking a tiltable axle against tilt. This mechanism locks the tiltable axle to the body frame when the weight of a carried object is greater than or equal to a predetermined value and the position of the forks are higher or equal to a predetermined height. When the carried object is heavy and is elevated to a relatively high position, the center of gravity of the vehicle is at a higher location. The higher location of the center of gravity makes the forklift unstable. However, the locking mechanism locks the axle to the body frame thereby allowing the forklift to lift and lower the object and to turn in a stable manner.

However, when locked to the body frame, the axle does not tilt relative to the body frame in accordance with the condition of the road surface. This may result in one of the front and rear wheels separating from the road surface. When an object on the forks is light or when there is no object on the forks, the center of gravity is located relatively close to the rear end of the forklift. Therefore, locking the rear axle against tilt may cause one of the front wheels to separate from the road surface. When a relatively heavy object is mounted on the forks, the center of gravity is located relatively close to the front end of the forklift. In this state, locking the rear axle to the body frame may cause one of the rear wheels to separate from the road surface.

In a typical forklift, the front wheels are driven. Therefore, if one of the front wheels separates from the road surface or if the pressure pressing the front wheel against the road surface is decreased, the front wheel races. The racing of the front wheel prevents the driving force of the front wheels from being transmitted to the road surface. This hinders the traveling of the forklift.

SUMMARY OF THE INVENTION

Accordingly, it is a first objective of the present invention to provide a tilt controlling apparatus that locks a tiltable axle to a body frame in accordance with the location of the vehicle's center of gravity in the fore-and-aft direction for reducing loss of driving force of driven wheels.

A second objective of the present invention is to provide an apparatus and a method that accurately estimate the location of center of gravity in the fore-and-aft direction of a vehicle.

To achieve the foregoing and other objectives and in accordance with the purpose of the present invention, an apparatus for controlling the tilt of an axle that is supported by a body frame of an industrial vehicle to be tiltable in a vertical direction is provided. The vehicle has a front wheel and a rear wheel that are spaced apart by a predetermined distance in the fore-and-aft direction of the vehicle, a carrier for carrying an object and a locking mechanism for locking the axle against tilt. The front wheel or the rear wheel is supported by the axle. One of the front wheel and the rear wheel is a drive wheel that transmits driving force to the road surface. The apparatus includes a detector for detecting the location of the center of gravity in the fore-and-aft direction of the vehicle and a controller for controlling the locking mechanism based on the location of the center of gravity detected by the detector.

The present invention also provides an apparatus for estimating the location of the center of gravity in the fore-and-aft direction of an industrial vehicle. The vehicle has a carrier for carrying an object. The carrier is tiltable with respect to the body frame and is lifted and lowered with respect to the body frame. The apparatus includes an angle detector for detecting the tilt angle of the carrier, a height detector for detecting the height of the carrier, a weight detector for detecting the weight of an object on the carrier, and an estimator for estimating the location of the center of gravity in the fore-and-aft direction of the vehicle based on the detected tilt angle, height and weight.

The present invention further provides a method for estimating the location of the center of gravity in the fore-and-aft direction of an industrial vehicle. The vehicle has a carrier for carrying an object. The carrier is tiltable with respect to the body frame and is lifted and lowered with respect to the body frame. The method includes the steps of detecting the tilt angle of the carrier, detecting the height of the carrier, detecting the weight of an object on the carrier, and estimating the location of the center of gravity in the fore-and-aft direction of the vehicle based on the detected tilt angle, height and weight.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 3:
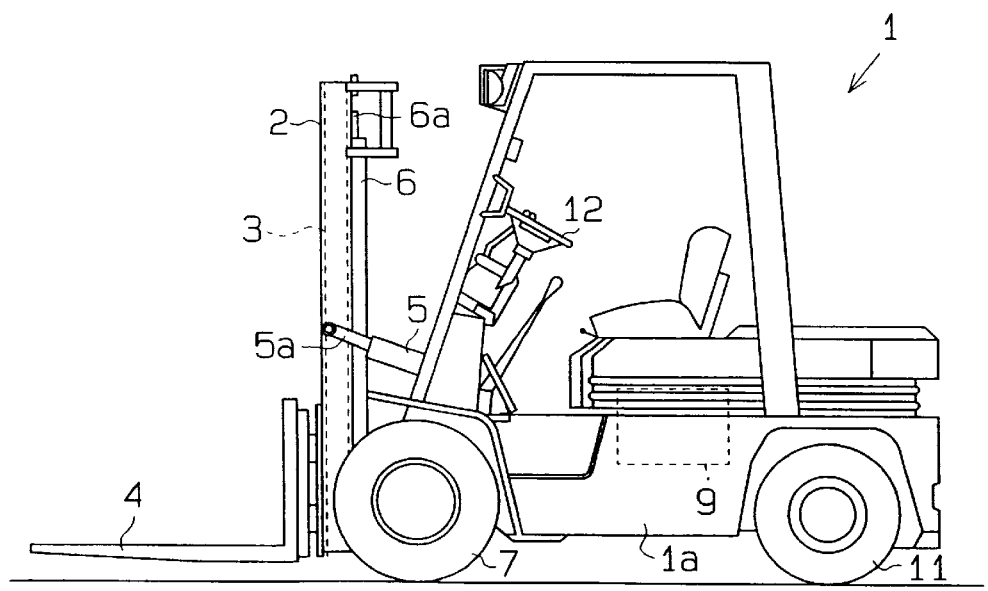
FIG. 3 is a side view of a forklift.

An embodiment according to the present invention will now be described. FIG. 3 is a side view of an industrial vehicle, or a forklift 1. The forklift 1 has four wheels, that is, two driven front wheels 7 and two steered rear wheels 11. A pair of left and right outer masts 2 are supported on the front of a body frame 1a. A pair of inner masts 3 are arranged between the outer masts 2. A fork 4 is coupled to each inner mast 3 by a chain 4a (see FIG. 1). The forks 4 are lifted and lowered integrally with the associated inner masts 3 along the outer masts 2.

Each outer mast 2 is coupled to the body frame 1a by a tilt cylinder 5. Specifically, each cylinder 5 includes a piston rod 5a, and the distal end of each piston rod 5a is coupled to the corresponding outer mast 2. The tilt cylinders 5 extend and retract the piston rods 5a thereby inclining the outer masts 2. A lift cylinder 6 is located on the inner side of each outer mast 2. Each lift cylinder 6 includes a piston rod 6a, which is coupled to the top end of the corresponding inner mast 3. The lift cylinders 6 extend and retract the piston rods 6a thereby lift and lower the forks 4. Each front wheel 7 is connected to an engine 9 by a differential ring gear 8 (see FIG. 1) and a transmission (not shown). Thus, the front wheels 7 are driven by the engine 9.

Figure 1:
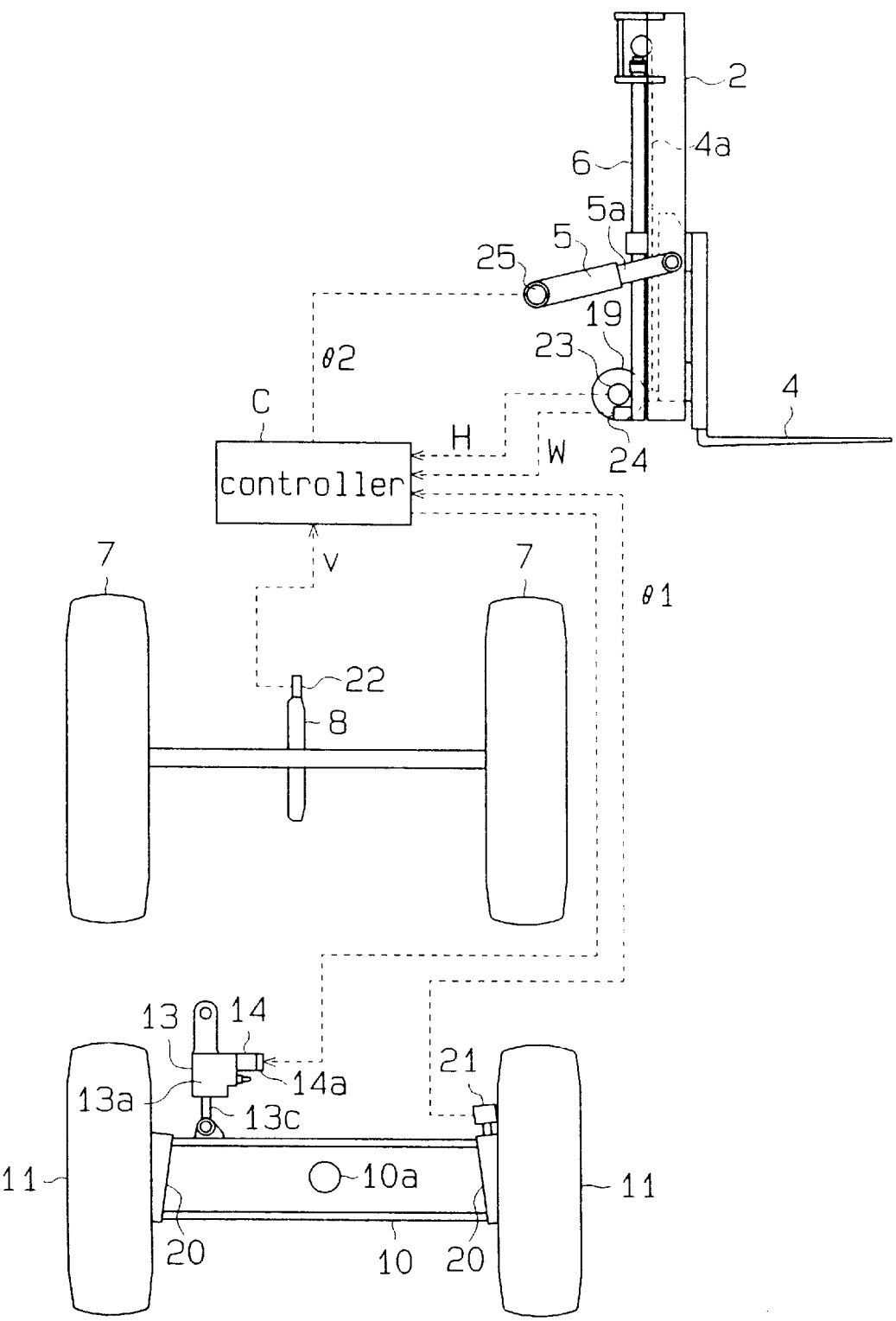
FIG. 1 is a diagrammatic view showing one embodiment of a tilt controlling apparatus according to the present invention.
Figure 2:
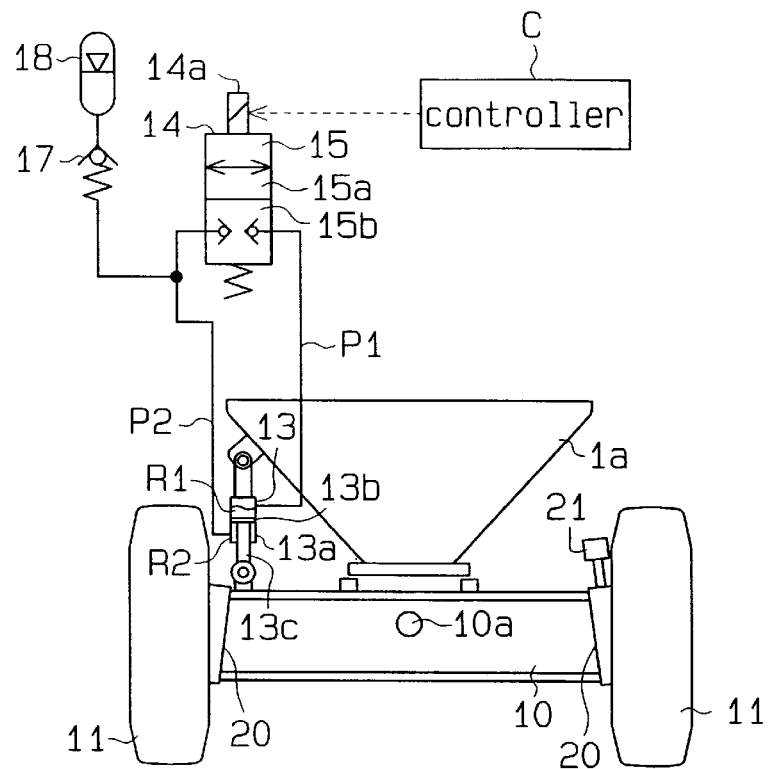
FIG. 2 is a diagrammatic view showing an axle locking mechanism.

As shown in FIGS. 1 and 2, a rear axle 10 extends laterally through the lower portion of the body frame 1a. The rear axle 10 is pivotally coupled to the body frame 1a by a center pin 10a. The rear axle 10 pivots about the center pin 10a in a plane parallel to the surface of the sheet of FIGS. 1 and 2.

The steered wheels, or the rear wheels 11, are coupled to the ends of the rear axle 10 by kingpins 20. Each rear wheel 11 is pivoted integrally with the corresponding kingpin 20. The rear axle 10 has a steering cylinder (not shown), which has left and right piston rods. The distal end of each piston rod is coupled to the associated rear wheel 11 by a link mechanism (not shown). The steering cylinder steers the rear wheels 11 based on manipulation of a steering wheel 12 (see FIG. 3) provided in an operator compartment.

As shown in FIG. 2, a hydraulic damper 13 connects the body frame 1a with the rear axle 10. The damper 13 includes a multi-movement type hydraulic cylinder. The damper 13 has a housing 13a, a piston 13b and a piston rod 13c. The housing 13a is secured to the body frame 1a and houses the piston 13b. The piston rod 13c extends from the piston 13b and is coupled to the rear axle 10.

The piston 13b defines a first oil chamber R1 and a second oil chamber R2 in the housing 13a. The first oil chamber R1 is connected to one end of a first passage P1 and the second oil chamber R2 is connected to one end of a second passage P2. The other ends of the passages P1, P2 are connected to a shutoff valve 14. The shutoff valve 14 is a two-way valve that includes a housing, which accommodates a spool 15. The spool 15 includes a portion 15a for connecting the passages P1 and P2 with each other and another portion 15b for disconnecting the passages P1 and P2 from each other. The disconnecting portion 15b includes a check valve. An accumulator 18, which stores hydraulic oil, is connected to the second passage P2 by a check valve 17.

When de-excited, the solenoid 14a positions the disconnecting portion 15b of the spool 15 between the passages P1 and P2 for disconnecting the passages P1 and P2 from each other. This stops oil flow from and to the chambers R1, R2 in the damper 13. As a result, the rear axle 10 is locked against tilt. That is, tilting of the rear axle 10 is prohibited. When excited, on the other hand, the solenoid 14a positions the connecting portion 15a between the passages P1 and P2 for connecting the passages P1 and P2 with each other. This permits oil flow to and from the chambers R1 and R2. As a result, the tilting of the rear axle 10 is permitted.

The damper 13 and the shutoff valve 14 constitute a mechanism for locking the rear axle 10 against tilt, that is, for prohibiting the tilting of the axle 10. If hydraulic oil leaks from the damper 13, the accumulator 18 supplies hydraulic oil to the damper 13 through the check valve 17. The check valve 17 prevents hydraulic oil from flowing from the damper 13 to the accumulator 18.

The shutoff valve 14 is a normally-closed type, that is, the valve 14 disconnects the passages P1 and P2 from each other when the solenoid 14a is de-excited. However, the valve 14 may be replaced with a normally-open type shutoff valve that connects the passages P1 and P2 with each other when the solenoid 14a is de-excited.

As shown in FIGS. 1 and 2, a wheel angle sensor 21 is attached on the top of the kingpin 20. The wheel angle sensor 21 detects the wheel angle θ1 of the rear wheels 11 based on the rotational angle of the kingpin 20. The wheel angle sensor 21 includes, for example, a potentiometer. As shown in FIG. 1, the vehicle speed sensor 22 is attached to the differential ring 8. The vehicle speed sensor 22 detects the speed V of the forklift 1 based on rotation of the gear 8.

As shown in FIG. 1, a reel 19 is located at the lower end of the inner masts 2. A wire (not shown) is wound about the reel 19. One end of the wire is coupled to the inner masts 3. The reel 19 is urged in a rotational direction to wind the wire for preventing the wire from loosening. A height sensor 23 for detecting the height H, or the vertical position, of the forks 4. The sensor 23 detects rotational amount of the reel 19, that is, the wound amount of the wire, as the height H of the forks 4. The height H of the forks 4 varies between zero to six meters.

A pressure sensor 24 is attached to the lift cylinder 6. The sensor 24 detects the oil pressure in the cylinder 6 as the weight W of an object placed on the forks 4. The forks 4 bears an object weighing up to two tons.

The tilt cylinder 5 is provided with a mast angle sensor 25 that detects the angle θ2 of the outer masts 2. The angle θ2 represents the inclination of the outer masts 2 relative to the body frame 1a. The sensor 25 detects the inclination of the tilt cylinder 5 as the angle θ2 of the masts 2. Specifically, when the outer masts 2 are perpendicular to the base of the body frame 1a, the angle θ2 is set to referential zero degrees. The outer masts 2 is inclined either forward or rearward by six degrees from the zero degree position. When the outer masts 2 are inclined forward, the mast angle θ2 has a positive value. When the outer mast 2 are inclined rearward, the mast angle θ2 has a negative value.

The solenoid 14a of the shutoff valve 14 and the sensors 21–25 are electrically connected to a controller C mounted on the forklift 1. The height sensor 23, the pressure sensor 24, the mast angle sensor 25 and the controller C constitute means for detecting the location of the forklift's center of gravity.

Figure 4:
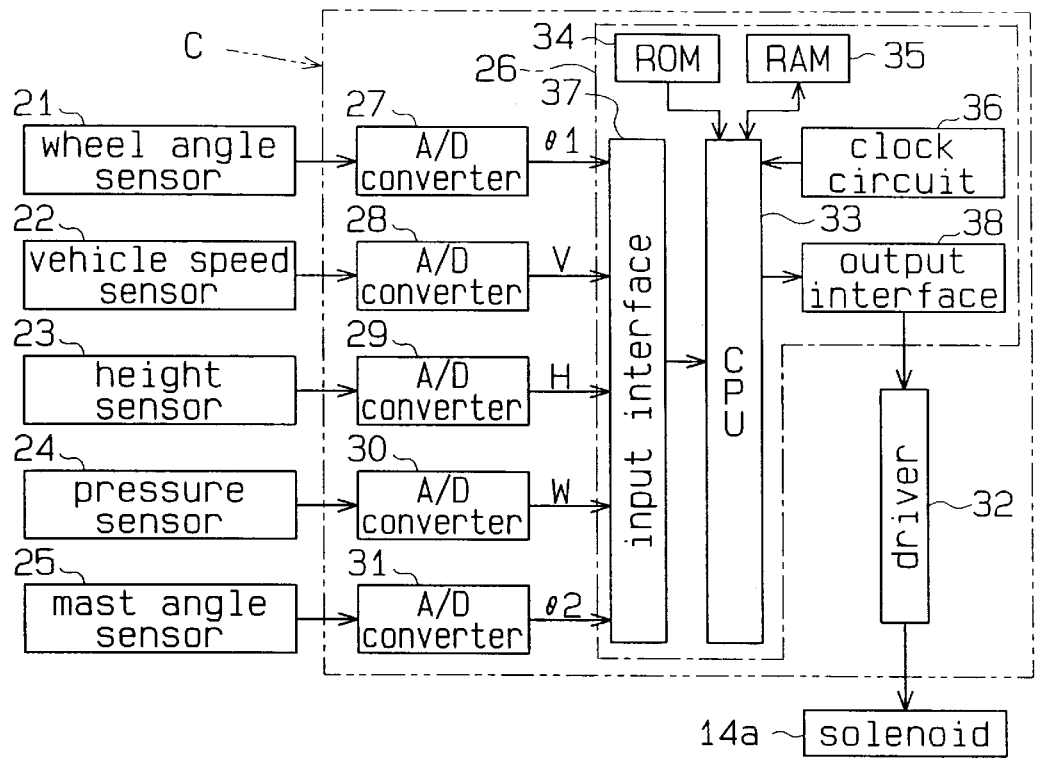
FIG. 4 is a block diagram showing an electric configuration of the forklift.

The electric configuration of the forklift 1 will now be described with reference to FIG. 4. The controller C includes a microcomputer 26, analog-to-digital (A/D) converters 27–31 and a driver 32. The microcomputer 26 has a central processing unit (CPU) 33, a read only memory (ROM) 34, a random access memory (RAM) 35, a clock circuit 36, an input interface 37 and an output interface 38.

The CPU 33 inputs detected values θ1, V, H, W and θ2 from the wheel angle sensor 21, the vehicle speed sensor 22, the height sensor 23, the pressure sensor 24 and the mast angle sensor 25 by way of the A/D converters 27–31. The CPU 33 also sends locking/unlocking commands to the driver 32 for selectively exciting and de-exciting the solenoid 14a of the shutoff valve 14. When the driver 32 de-excites the solenoid 14a based on a locking command from the CPU 33, the shutoff valve 14 disconnects the first and second passages P1, P2 from each other. This locks the rear axle 10 against tilt. When the driver 32 excites the solenoid 14a based on an unlocking command from the CPU 33, the shutoff valve 14 communicates the passages P1, P2 with each other. This allows the rear axle 10 to tilt with respect to the body frame 1a.

Figure 7A:
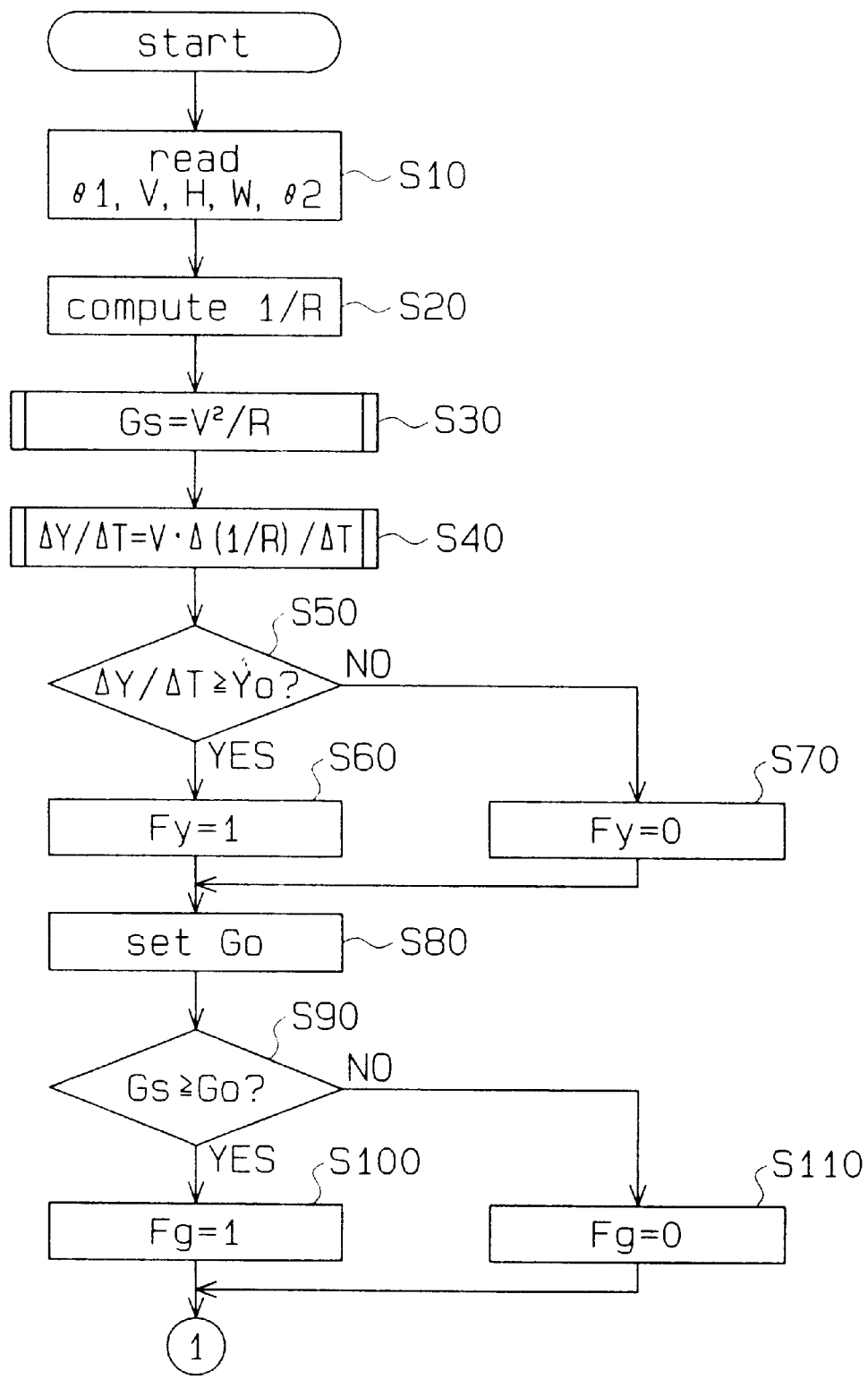
FIGS. 7(a) and 7(b) are flowcharts of a tilt controlling routine.
Figure 7B:
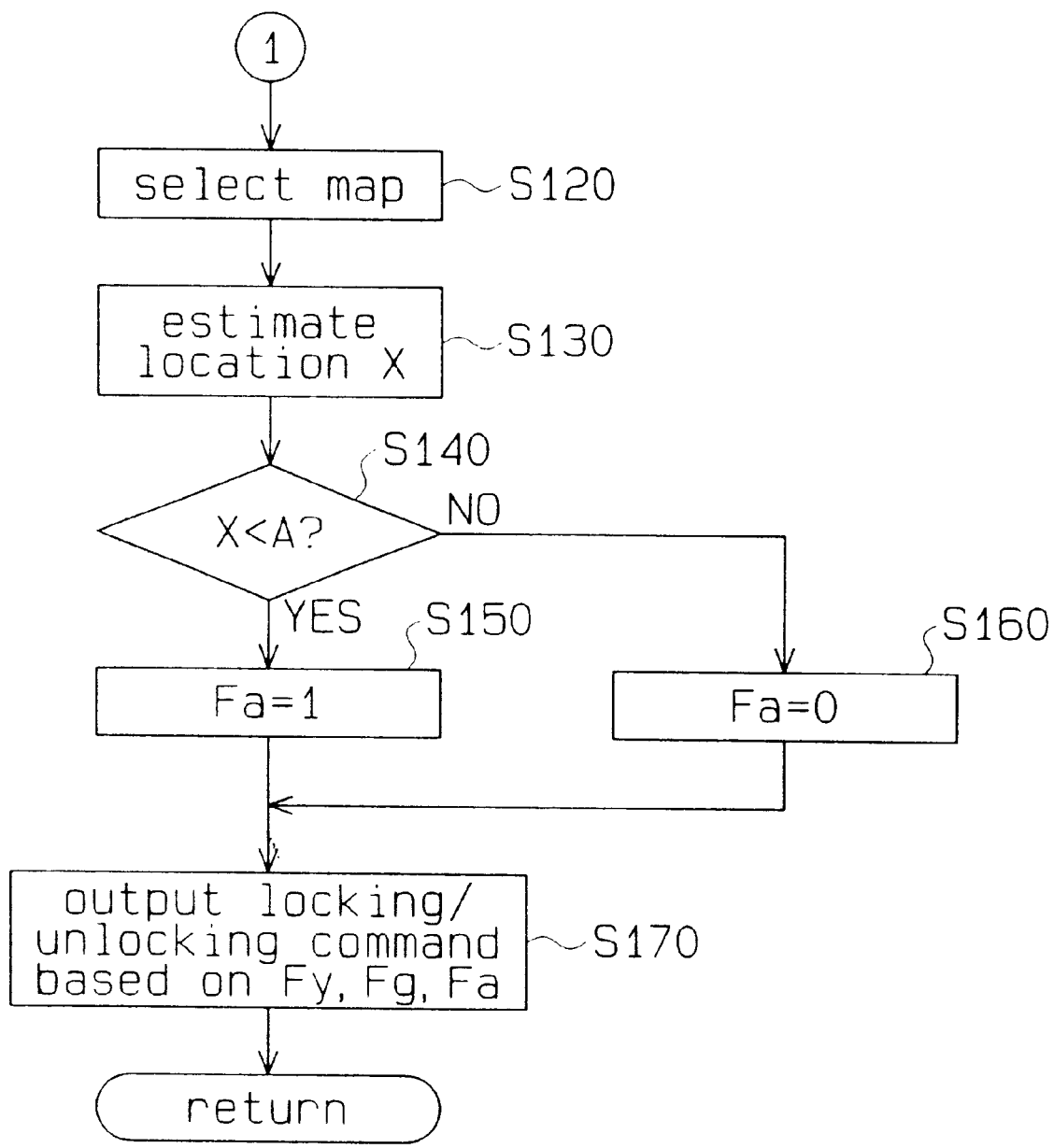

The ROM 34 stores program data including a tilt control program shown in FIGS. 7(a) and 7(b). The tilt control refers to a control for permitting and prohibiting tilting of the rear axle 10 as necessary for maintaining preferable traveling state of the forklift 1.

The tilt control executed by the CPU 33 will now be described with reference to the flowcharts of FIGS. 7(a) and 7(b). During an operation of the forklift, the CPU 33 executes the following tilt control every predetermined time period ΔT (for example, ten to fifty milliseconds).

As shown in FIG. 7(a), the CPU 33 inputs the wheel angle θ1, the vehicle speed V, the height H of the forks 4, the weight W of the carried object and the mast angle θ2 from the sensors 21–25 at step 10. At step 20, the CPU 33 computes the inverse number (1/R) of turn radius R of the forklift 1 using a map (not shown) stored in the ROM 34 based on the wheel angle θ1.

At step 30 computes the lateral acceleration Gs acting on the forklift 1 by using the following equation (1) based on the vehicle speed V and the inverse number (1/R) of the turn radius R. The lateral acceleration Gs refers to a centrifugal acceleration that laterally acts on the forklift 1 when the forklift 1 is turning.

$$Gs = V^2/R \quad (1)$$

At step 40, the CPU 33 computes the rate of change of the yaw rate ΔY in a predetermined time period ΔT, or the changing rate of the yaw rate (ΔY/ΔT), by using the following equation (2).

$$\Delta Y/\Delta T = V \cdot \Delta(1/R)/\Delta T \quad (2)$$

In the equation (2), Δ(1/R) is the difference between the inverse number (1/R) of the turn radius R computed in the current routine and the inverse number (1/R) computed in the previous routine. The RAM 35 stores a plurality of inverse numbers (1/R) in the precedent routines.

At step 50, the CPU 33 judges whether the changing rate ΔY/ΔT of the yaw rate is greater than or is equal to a predetermined determination value Yo, which is previously stored in the ROM 34. The determination value Yo is used for judging whether the tilt of the rear axle 10 needs to be prohibited. The value Yo is determined based on road tests or is theoretically calculated in consideration of the height of the forklift's center of gravity. Specifically, the value Yo is determined such that the tilt of the rear axle 10 is prohibited when the traveling of the forklift 1 is destabilized.

If the changing rate ΔY/ΔT of the yaw rate is greater or equal to the determination value Yo at step 50, the CPU 33 moves to step 60. At step 60, the CPU 33 sets flag Fy to one. If ΔY/ΔT is smaller than the value Yo, the CPU 33 moves to step 70 and sets the flag Fy to zero. The value one of the flag Fy indicates that a condition for locking the rear axle 10 against tilt is satisfied. The value zero of the flag Fy indicates that the condition is not satisfied.

In step 80, the CPU 33 computes a determination value Go of the lateral acceleration Gs based on the weight W of the object carried by the forks 4 and the height H of the forks 4. The value Go is used to judge whether the tilt of the rear axle 10 needs to be prohibited. The ROM 34 previously stores values G1 and G2 (G1<G2) of the determination value Go. The values G1, G2 determined based on road tests or is theoretically calculated in consideration of the height of the forklift's center of gravity. Specifically, the values G1, G2 are determined such that the tilt of the rear axle 10 is prohibited when the traveling of the forklift 1 is destabilized.

The determination value Go is selected in accordance with the weight W of the object carried and the height H of the forks 4. When the weight W is less than one ton and the height H is less than three meters, the relatively great value G2 is selected as the determination value Go. When the weight W is less than one ton and the height H is greater than or equal to three meters, the value G1, which is smaller than G2, is selected as the determination value Go. When the weight W is greater than or equal to one ton and the height H is less than three meters, the value G2 is selected as the determination value Go. When the weight W is greater than or equal to one ton and the height H is greater than or equal to three meters, the determination value Go is set to zero.

At step 90, the CPU 33 judges whether the detected lateral acceleration Gs is greater than or equal to the determination value Go. If the lateral acceleration Gs is greater than or equal to the determination value Go, the CPU 33 moves to step 100 and sets a flag Fg to one. If the lateral acceleration Gs is less than the determination value Go, the CPU 33 moves to step 110 and sets the flag Fg to zero. The value one of the flag Fg indicates that a condition for locking the rear axle 10 against tilt is satisfied, whereas the value zero of the flag Fg indicates that the condition is not satisfied.

Figure 6A:
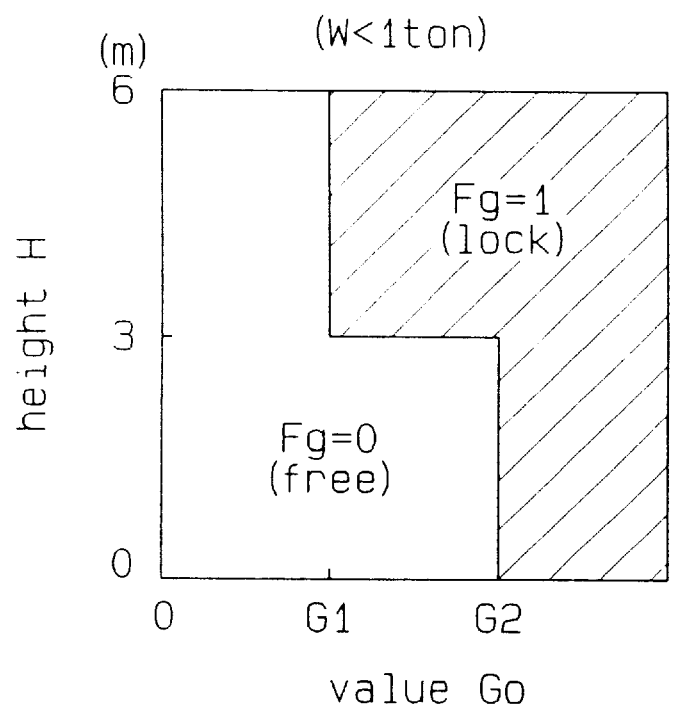
FIGS. 6(a) and 6(b) are diagram for explaining a process for determining the value of a flag based on a determination value of lateral acceleration.
Figure 6B:
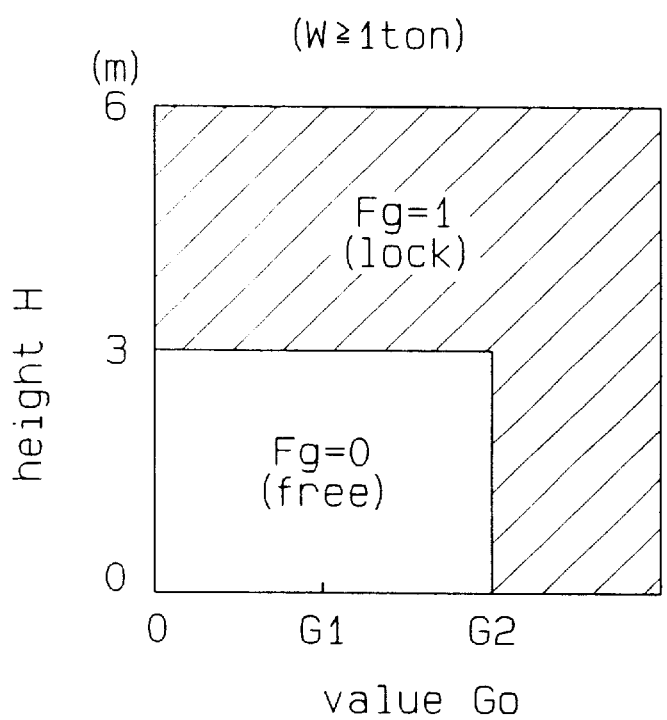

The steps 90, 100 and 110 are described with reference to FIGS. 6(a) and 6(b). A process executed when the weight W of the carried object is less than one ton, that is, when the carried object is relatively light, is described with reference to the diagram of FIG. 6(a). Specifically, when the height H is smaller than three meters, the value G2 is selected as the determination value Go. In this case, if the lateral acceleration Gs is greater than or equal to the determination value G2, the flag Fg is set to one, and if the lateral acceleration Gs is less than the determination value G2, the flag Fg is set to zero. When the height H is greater than or equal to three meters, the value G1 is selected as the determination value Go. In this case, if the lateral acceleration Gs is greater than or equal to the determination value G1, the flag Fg is set to one, and if the lateral acceleration Gs is less than the determination value G1, the flag Fg is set to zero.

A process executed when the weight W of the carried object is greater or equal to one ton, that is, when the carried object is relatively heavy, is described with reference to the diagram of FIG. 6(b). As in the case where the weight W is less than one ton, the value G2 is selected as the determination value Go when the height H is less than three meters. In this case, if the lateral acceleration Gs is greater than or equal to the determination value G2, the flag Fg is set to one, and if the lateral acceleration Gs is less than the determination value G2, the flag Fg is set to zero. When the height H is greater than or equal to three meters, the determination value Go is set to zero. In this case, if the lateral acceleration Gs is greater than or equal to zero, the flag Fg is set to one, and if the lateral acceleration Gs is less than zero, the flag Fg is set to zero. However, the lateral acceleration Gs never becomes less than zero. Thus, if the weight W is greater or equal to one ton and the height H of the forks 4 is greater than or equal to three meters, the flag Fg is always set to one.

Figure 8:
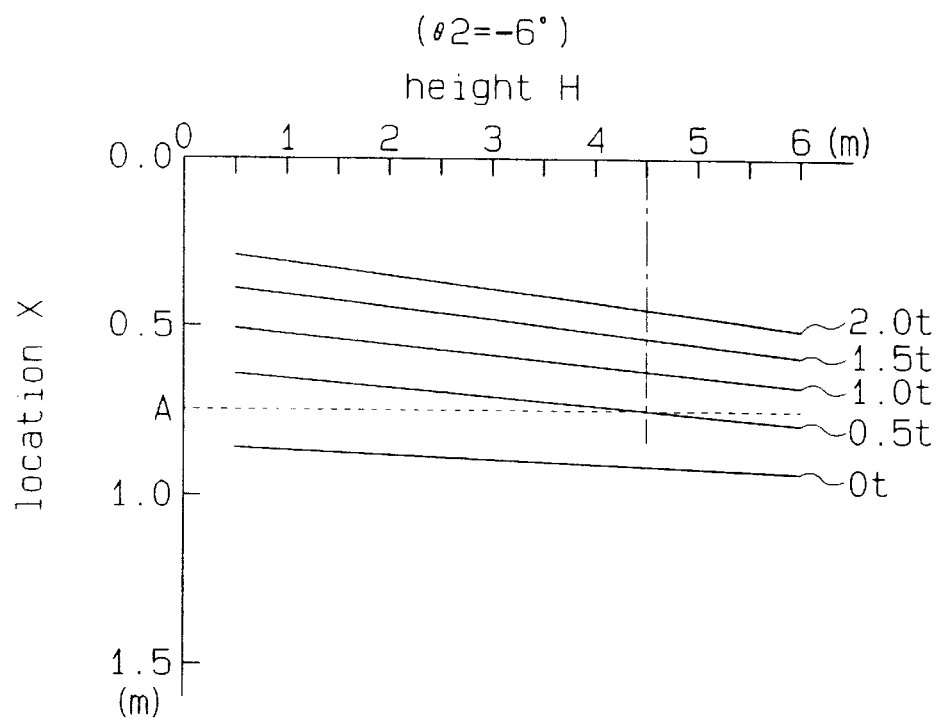
FIG. 8 is a map for estimating the center of gravity.
Figure 9:
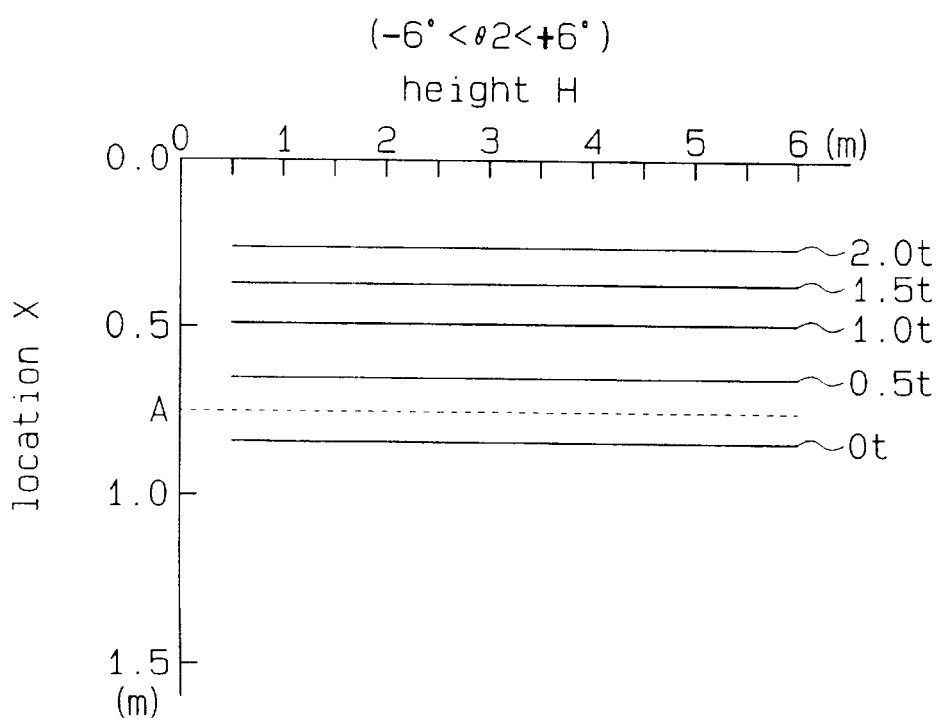
FIG. 9 is a map for estimating the center of gravity.
Figure 10:
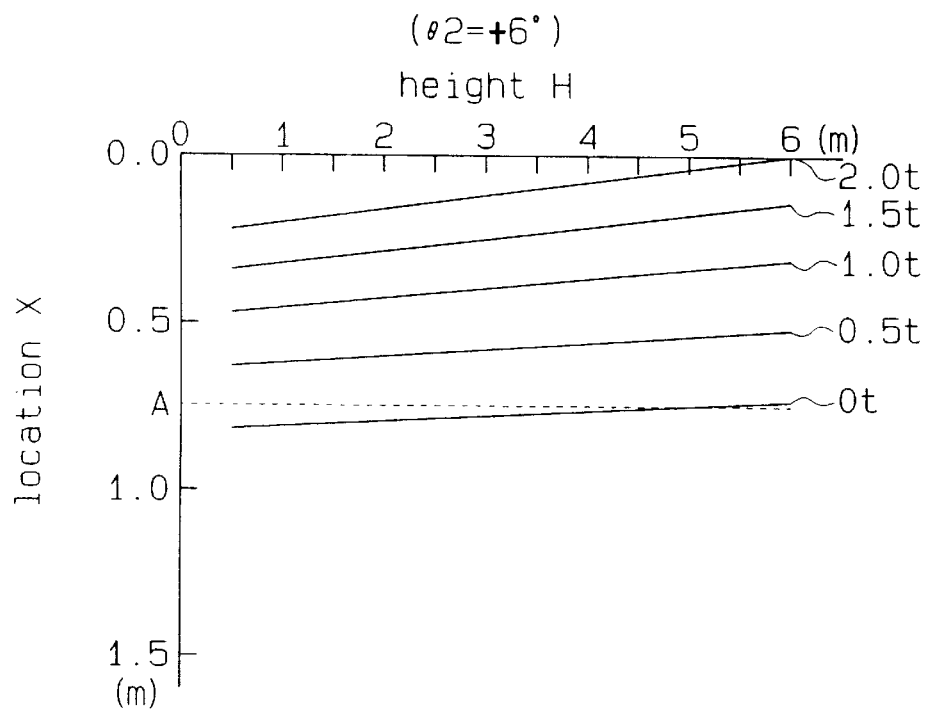
FIG. 10 is a map for estimating the center of gravity.

In step 120 of FIG. 7(b), the CPU 33 selects a map for estimating the location X of the forklift's center of gravity among maps of FIGS. 8–10 based on the mast angle θ2. The maps of FIGS. 8–10 are previously stored in the ROM 34. When the mast angle θ2 is minus six degrees, or when the outer masts 2 are inclined rearward by six degrees, the map of FIG. 8 is selected. When the mast angle θ2 is six degrees, or when the outer masts 2 are inclined forward by six degrees, the map of FIG. 10 is selected. When the mast angle θ2 is greater than minus six degrees and smaller than six degrees, the map of FIG. 9 is selected.

Figure 11:
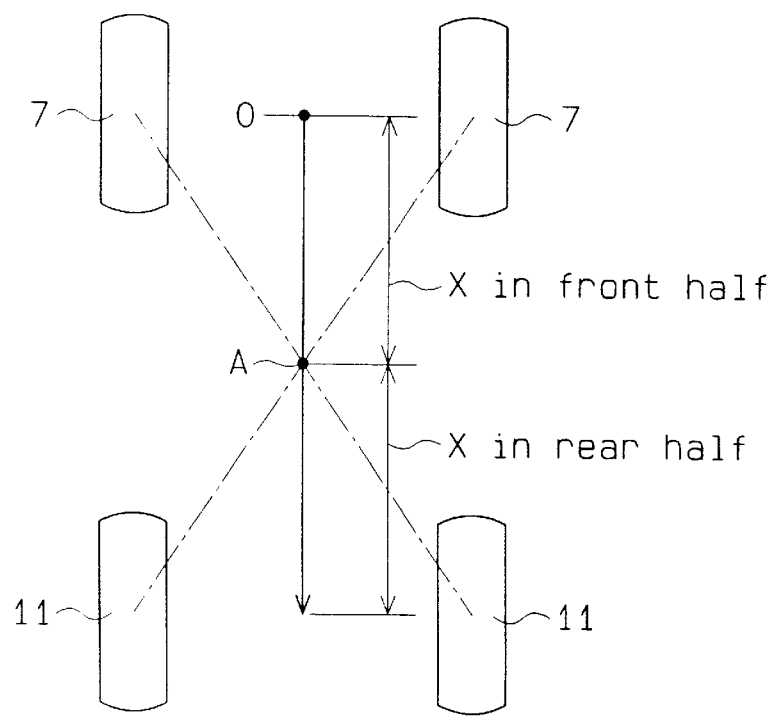
FIG. 11 is a diagram illustrating a referential location of the center of gravity.

At step 130, the CPU 33 estimates the location X of the forklift's center of gravity in the fore-and-aft direction using the selected map based on the height H of the forks 4 and the weight W of the carried object. As shown in FIG. 11, the position X of the center of gravity is expressed by a distance toward the rear end of the vehicle from a referential point, or the point where the front wheels 7 contact the road surface.

The maps of FIGS. 8–10 define the relationship between the height H of the forks 4 and the location X of the center of gravity in relation to the weight W. In the maps the weight W ranges from zero to two tons. If the map of FIG. 8 is selected, that is, if the mast angle θ2 is minus six degrees, the value indicating the location X of the center of gravity decreases as the weight W of the carried object increases and increases as the height H of the forks 4 increases. If the map of FIG. 10 is selected, that is, if the mast angle θ2 is six degrees, the value of the location X decreases as the weight W increases and decreases as the height H of the forks 4 increases. If the map of FIG. 9 is selected, that is, if the mast angle θ2 is greater than minus six degrees and smaller than six degrees, the value of the location X decreases as the weight W of the carried object increases and remains unchanged as the height H of the forks 4 changes.

At step 140, the CPU 33 determines the estimated value of the location X of the center of gravity is less than a determination value A, which is previously stored in the ROM 34. The determination value A is used to judge whether the driving force of the front wheels 7 is sufficiently transmitted to the road surface. As shown in FIG. 11, the value A is set, for example, to the half of the distance between the referential position, or the ground contact of the front wheels 7, and the ground contact of the rear wheels 11. In other words, the value A is set to the half of the wheel base of the forklift 1. Therefore, when the wheel base is 1.5 meters, the determination value A is 0.75 meters as shown in the maps of the FIGS. 8–10.

If the value of the location X is smaller than the determination value A at step 140, that is, if the location X is in the front half of the forklift 1, the CPU 33 moves to step 150. At step 150, the CPU 33 sets a flag Fa to one. If the value of the location X is greater than the determination value A, that is, if the location X is in the rear half of the forklift 1, the CPU 33 moves to step 160 and sets the flag Fa to zero. The value one of the flag Fa indicates that the driving force of the front wheels 7 is sufficiently transmitted to the road surface. The value zero of the flag Fa indicates that the driving force of the front wheels 7 is not sufficiently transmitted to the road surface. In other words, the value one of the flag Fa indicates that a condition for locking the rear axle 10 against tilt is satisfied, whereas the value zero indicates that the condition is not satisfied.

When the mast angle θ2 is minus six degrees, the map of FIG. 8 is used. If the weight W of the carried object is zero, the value of the location X of the center of gravity is always greater than the determination value A at any height H of the forks 4. The value of the flag Fa is thus set to zero. If the weight W of the object is 0.5 ton, the value of the location X is greater than or equal to the value A when the height H of the forks 4 is greater than or equal to 4.5 meters. The value of the location X is smaller than the value A if the height H is smaller than 4.5 meters.

At a subsequent step 170, the CPU 33 sends a locking command or an unlocking command to the driver 32 based on the values of the flags Fy, Fg, Fa, which are in the current routine. Specifically, if at least one of the flags Fy and Fg is one and the flag Fa is one, the CPU 33 sends a locking command to the driver 32. The locking command causes the shutoff valve 14 to disconnect the first and second passages P1 and P2 from each other. As a result, the rear axle 10 is locked against tilt. In other words, the tilting of the rear axle 10 is prohibited. If the flags Fy and Fg are both zero or if the flag Fa is zero, the CPU 33 sends an unlocking command to the driver 32. The unlocking command causes the shutoff valve 14 to communicate the first and second passages P1 and P2 with each other. As a result, tilting of the rear axle 10 with respect to the body frame 1a is permitted.

For example, if the weight W of the carried object is 0.5 ton and the height H of the forks 4 is six meters, the value G1 is selected as the determination value Go of the lateral acceleration Gs at step 80. If the lateral acceleration Gs is greater than or equal to the determination value G1, the flag Fg is set to one as shown in FIG. 6(a). In other words, one of the conditions for locking the rear axle 10 against tilt is satisfied. However, if the mast angle θ2 is minus six degrees, the map of FIG. 8 is selected for estimating the location X of the center of gravity. Since the weight W is 0.5 ton and the height H is six meters, the value representing the location X of the center of gravity is greater than the determination value A as shown in FIG. 8. That is, the location X is in the rear half of the forklift and the driving force of the front wheels 7 is not sufficiently transmitted to the road surface. In this case, the flag Fa is set to zero. The CPU 33 therefore does not send a locking commands to the driver 32. In other words the CPU 33 allows the rear axle 10 to tilt relative to the body from 1a.

As described above, even if the lateral acceleration Gs and the changing rate ΔY/ΔT of the yaw rate satisfy the conditions for locking the rear axle 10 against tilt, the rear axle 10 is not locked when the driving force of the front wheels 7 is judge to be insufficiently transmitted to the road surface based on the location X of the center of gravity. This prevents the front wheels 7 from being separated from the road surface. The force at which the front wheels 7 are pressed against the road surface is thus maintained. In other words, the forklifts 1 travels with the front wheels 7 constantly pressed against the road surface.

The determination value A of the location X of the center of gravity is set to a the half of the distance between the ground contact of the front wheels 7 and the ground contact of the rear wheels 11. The estimated value of the location X is judged to be greater than or equal to the determination value A. Accordingly, whether the location X is in the rear half of the vehicle is accurately and easily judged. Therefore, whether or not to permit the locking of the rear axle 10 is unerringly determined. This allows the front wheels 7 to constantly transmit the driving force to the road surface.

When estimating the location X of the center of gravity, a map corresponding to the current mast angle $\theta2$ is selected from the maps of FIGS. 8–10. The location X is estimated using the selected map based on the current height H of the forks 4 and the weight W of the carried object. The location X in the fore-and-aft direction changes in accordance with the mast angle $\theta2$, the height H of the forks 4 and the weight W of the carried object. Therefore, the estimated location X generally matches the actual location of the forklift's center of the gravity. Whether or not to permit the locking of the rear axle 10 is accurately judged based on the estimated location X.

The determination value Go of the lateral acceleration Gs is changed in a step wise manner in accordance with the height H of the forks 4 and the weight W of the carried object, that is, in accordance with the height of the forklift's center of gravity. Specifically, when the weight W is less than one ton as shown in FIG. 6(*a*), the value G2 is used as the determination value Go when the height H is less than three meters, and the value G1, which is smaller than G2, is used as Go when the height H is greater than or equal to three meters. When the weight W is greater than or equal to one ton as shown in FIG. 6(*b*), the value G2 is used as the determination value Go when the height H is less than three meters, and the Go is set to zero when the height H is greater than or equal to three meters. In this manner, the determination value Go of the lateral acceleration Gs is changed in accordance with the height H of the forks 4 and the weight W of the carried object. Thus, whether or not to permit the locking of the rear axle 10 is always accurately judged in accordance with the height of the forklift's center of gravity. This improves the stability of the forklift 1.

Figure 5:
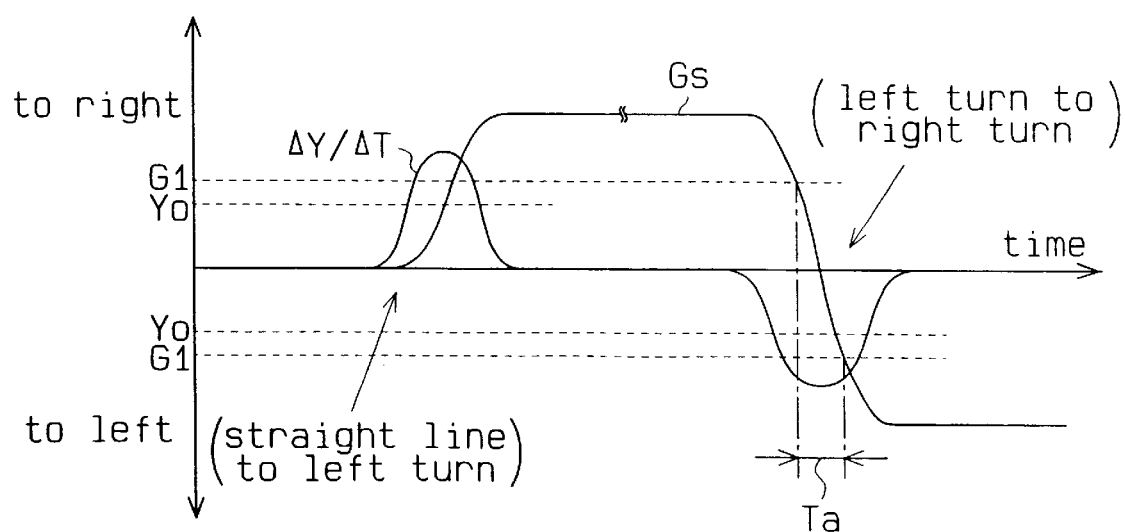
FIG. 5 is a graph showing changes in lateral acceleration and changes in rate of change of yaw rate during turns of a forklift.

FIG. 5 is a graph showing changes of the lateral acceleration Gs and the changing rate $\Delta Y/\Delta T$ of the yaw rate when the forklift 1 turns. For example, if the forklift 1 turns to the left from the straight line traveling state, the changing rate $\Delta Y/\Delta T$ of the yaw rate exceeds the determination value Yo before the lateral acceleration Gs reaches the determination value Go (G1 in this case). The rear axle 10 is therefore locked relatively early. If the wheel angle $\theta1$ reaches and is maintained at a certain value, the changing rate $\Delta Y/\Delta T$ of the yaw rate becomes smaller than the determination value Yo. However, by this point in time, the lateral acceleration Gs exceeds the determination value Go. Therefore, the rear axle 10 is kept locked against tilt. This permits the forklift 1 to stably turn.

Further, when the forklift 1 turns to the right from the state of a left turn, the direction of the lateral acceleration Gs changes from the right to the left. The lateral acceleration Gs becomes smaller than the determination value G1 during a period Ta in the graph of FIG. 5. However, the changing rate $\Delta Y/\Delta T$ of the yaw rate is greater than the determination value Yo during the period Ta. Therefore, when the forklift 1 changes the turning direction, the locking of the rear axle 10 is not released and the forklift 1 turns in a stable manner. As described above, even if the lateral acceleration Gs and the changing rate $\Delta Y/\Delta T$ of the yaw rate satisfy the conditions for locking the rear axle 10 against tilt, the locking of the rear axle 10 is not permitted when the driving force of the front wheels 7 is judge to be insufficiently transmitted to the road surface based on the location X of the center of gravity.

The above illustrated embodiment may be modified as follows:

The determination value A of the location X of the center of gravity may be changed. For example, if the determination value A is set smaller than the half of the distance between the front wheels 7 and the rear wheels 11, the loss of the driving force of the front wheels 7 is more effectively avoided. If the determination value is greater than the half of the distance between the front wheels 7 and the rear wheels 11, the locking of the rear axle 10 is permitted in wider range of situations.

In the illustrated embodiment, the changing rate $\Delta Y/\Delta T$ of the yaw rate and the lateral acceleration Gs are computed based on the detected values $\theta1$, V, H, W, $\theta2$ from the sensors 21–25. Whether or not the conditions for locking the rear axle 10 are satisfied is judged based on the values of $\Delta Y/\Delta T$ and Gs. However, the forklift 1 may be provided with a gyroscope or an acceleration sensor and values detected by the gyroscope or the acceleration sensor may be used to judge whether the conditions for locking the rear axle 10 are satisfied.

In the illustrated embodiment, the determination value Go of the lateral acceleration Gs is changed in a step wise manner in accordance with the height H of the forks 4 and the weight W of the carried object. However, the determination value Go may be changed continuously.

In the illustrated embodiment, three maps shown in FIGS. 8–10 are used for estimating the location X of the center of gravity. That is, one of the three maps is selected in accordance with the mast angle $\theta2$. However, four or more maps each corresponding to a different range of the mast angle $\theta2$ may be employed. For example, five maps each corresponding to minus six degrees, minus three degrees, zero degrees, three degrees and six degrees of the mast angle $\theta2$ may be employed. A greater number of the maps allows the location X of the center of gravity to be detected more accurately.

Further, only the map of FIG. 8, or a map corresponding to minus six degrees of the mast angle $\theta2$, may be employed for estimating the location X of the center of gravity. This eliminates the necessity for the sensor 25 for detecting the mast angle $\theta2$ thereby simplifying the structure necessary for controlling the tilt of the rear axle 10.

In the maps of FIGS. 8–10, the data of the relationship between the height H of the fork 4 and the location X of the center of gravity is represented by five straight lines, and each line corresponds to a different value of the weight W of the carried object. However, six or more lines each corresponding to a different value of the weight W may be employed in the maps of FIGS. 8–10. This allows the location X to be more accurately estimated. In particular, increasing the number of the lines in the vicinity of the determination value A improves the accuracy of the judgment for permitting the locking of the rear axle 10, while maintaining the total number of the lines as small as possible.

The mechanism for locking the rear axle 10 may be changed. For example, two or more dampers 13 may be employed. Further, the construction of the shutoff valve 14 may be altered.

The present invention may be embodied in forklifts having different sizes or different configurations. In this case, the maps of FIGS. 8–10 and the other necessary data necessary for the tilt control are changed in accordance with the type of the forklift.

The present invention may be embodied in a forklift having untiltable outer masts. Also, the present invention may be embodied in other types of industrial vehicles. If the present invention is embodied in a forklift having untiltable outer masts, the sensor 25 for detecting the mast angle θ2 is not needed. Further, only one map is needed for estimating the center of gravity. Accordingly, the features for the tilt control becomes simple.

In the illustrated embodiment, the front wheels 7 are driven. However, the rear wheels 11 may be driven. In this case, the rear axle 10 is locked when the value of the location X is grater than the determination value A. Further, the front wheels 7 may be supported on an axle that is tiltable relative to the body frame 1a.

The accumulator 18 and the check valve 17 may be omitted. The damper 13 and the shutoff valve 14 may not be integrated as illustrated in FIG. 1. That is, a damper and a shutoff valve that are separately formed from each other may be employed.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling the tilt of an axle, the axle being supported by a body frame of an industrial vehicle to be tiltable in a vertical direction, wherein the vehicle has a front wheel and a rear wheel that are spaced apart by a predetermined distance in the fore-and-aft direction of the vehicle, a carrier for carrying an object and a locking mechanism for locking the axle against the tilt, wherein the front wheel or the rear wheel is supported by the axle, and wherein one of the front wheel and the rear wheel is a drive wheel that transmits driving force to a road surface, the apparatus comprising:

means for detecting the location of the center of gravity in the fore-and-aft direction of the vehicle; and wherein the means for detecting includes a controller for controlling the locking mechanism based on the location of the center of gravity detected by the means for detecting.

2. The apparatus according to claim 1, wherein the carrier is tiltable with respect to the body frame and is lifted and lowered with respect to the body frame, wherein the means for detecting includes:

an angle detector for detecting the tilt angle of the carrier;

a height detector for detecting the height of the carrier;

a weight detector for detecting the weight of an object on the carrier; and the controller, which comprises an estimator for estimating the location of the center of gravity based on the detected tilt angle, height and weight.

3. The apparatus according to claim 2, wherein the estimator includes a memory that stores a plurality of map data each of which corresponds to a different value of the tilt angle of the carrier, and wherein the map data define the relationship between the height of the carrier and the location of the center of gravity in accordance with the weight of the object on the carrier.

4. The apparatus according to claim 1, wherein the controller includes:

a first determiner for determining whether the traveling state of the vehicle satisfies a locking condition, which is predetermined in consideration of the height of the center of gravity of the vehicle; and a second determiner for determining whether the location of the center of gravity detected by the means for detecting satisfies a predetermined locking permitting condition, wherein the controller actuates the locking mechanism to lock the axle when the first determiner determines that the locking condition is satisfied and the second determiner determines that the locking permitting condition is satisfied.

5. The apparatus according to claim 4, wherein the second determiner determines that the locking permitting condition is satisfied if the drive wheel contacts the road surface in such manner to sufficiently transmit the driving force to the road surface when the location of the center of gravity in the fore-and-aft direction of the vehicle is at the detected location of the center of gravity.

6. The apparatus according to claim 5, wherein the second determiner determines that the locking permitting condition is satisfied when the detected location of the center of gravity is closer to the drive wheel than the midpoint of the front wheel and the rear wheel.

7. The apparatus according to claim 4, wherein the traveling state of the vehicle is represented by centrifugal acceleration acting on the vehicle and the rate of change of a yaw rate, and wherein the first determiner determines that the locking condition is satisfied when at least one of the centrifugal acceleration and the rate of change of the yaw rate is equal to or greater than a predetermined determination value.

8. The apparatus according to claim 7, wherein one of the front wheel and the rear wheel is a steered wheel that is steered for turning the vehicle, and wherein the controller includes a computer for computing the centrifugal acceleration and the rate of change of the yaw rate based on the wheel angle of the steered wheel and the speed of the vehicle.

9. The apparatus according to claim 7, wherein the first determiner changes a determination value related to the centrifugal acceleration in accordance with the height of the center of gravity of the vehicle.

10. The apparatus according to claim 9, wherein the carrier is lifted and lowered relative to the body frame of the vehicle, and wherein the height of the center of gravity is determined in accordance with the height of the carrier and the weight of the object on the carrier.

11. An apparatus for controlling the tilt of an axle, the axle being supported by a body frame of an industrial vehicle to be tiltable in a vertical direction, wherein the vehicle has a front wheel and a rear wheel that are spaced apart by a predetermined distance in the fore-and-aft direction of the vehicle, a carrier for carrying an object and a locking mechanism for locking the axle against tilt, wherein the front wheel is a drive wheel that transmits driving force to a road surface, and wherein the rear wheel is a steered wheel that is supported by the axle and is steered for turning the vehicle, the apparatus comprising:

a first determiner for determining whether the traveling state of the vehicle satisfies a locking condition, which is predetermined in consideration of the height of the center of gravity of the vehicle;

means for detecting the location of the center of gravity in the fore-and-aft direction of the vehicle;

a second determiner for determining whether the location of the center of gravity detected by the means for detecting satisfies a predetermined locking permitting condition; and wherein the means for detecting includes a controller for actuating the locking mechanism to lock the axle when the first determiner determines that the locking condition is satisfied and the second determiner determines that the locking permitting condition is satisfied.

12. The apparatus according to claim 11, wherein the carrier is tiltable with respect to the body frame and is lifted and lowered with respect to the body frame, wherein the means for detecting includes:

an angle detector for detecting the tilt angle of the carrier;

a height detector for detecting the height of the carrier;

a weight detector for detecting the weight of an object on the carrier; and the controller, which comprises an estimator for estimating the location of the center of gravity based on the detected tilt angle, height and weight.

13. The apparatus according to claim 12, wherein the estimator includes a memory that stores a plurality of map data each of which corresponds to a different value of the tilt angle of the carrier, and wherein the map data define the relationship between the height of the carrier and the location of the center of gravity in accordance with the weight of the object on the carrier.

14. The apparatus according to claim 12, wherein the second determiner determines that the locking permitting condition is satisfied when the detected location of the center of gravity is closer to the drive wheel than the midpoint of the front wheel and the rear wheel.

15. The apparatus according to claim 12, wherein the traveling state of the vehicle is represented by centrifugal acceleration acting on the vehicle and the rate of change of a yaw rate, and wherein the first determiner determines that the locking condition is satisfied when at least one of the centrifugal acceleration and the rate of change of the yaw rate is equal to or greater than a predetermined determination value.

16. The apparatus according to claim 15, wherein the controller comprises a computer for computing the centrifugal acceleration and the rate of change of the yaw rate based on the wheel angle of the steered wheel and the speed of the vehicle.

17. The apparatus according to claim 16, wherein the first determiner changes a determination value related to the centrifugal acceleration in accordance with the height of the carrier and the weight of the object on the carrier.

18. An apparatus for estimating the location of the center of gravity in the fore-and-aft direction of an industrial vehicle, wherein the vehicle has a carrier for carrying an object, and wherein the carrier is tiltable with respect to a body frame of the vehicle and is lifted and lowered with respect to the body frame, the apparatus comprising:

an angle detector for detecting the tilt angle of the carrier;

a height detector for detecting the height of the carrier;

a weight detector for detecting the weight of an object on the carrier; and an estimator for estimating the location of the center of gravity in the fore-and-aft direction of the vehicle based on the detected tilt angle, height and weight.

19. The apparatus according to claim 18, wherein the estimator includes a memory that stores a plurality of map data each of which corresponds to a different value of the tilt angle of the carrier, and wherein the map data define the relationship between the height of the carrier and the location of the center of gravity in accordance with the weight of the object on the carrier.

20. An apparatus for estimating the location of the center of gravity in the fore-and-aft direction of an industrial vehicle, wherein the vehicle has a carrier for carrying an object, and wherein the carrier is tiltable with respect to a body frame of the vehicle and is lifted and lowered with respect to the body frame, the method comprising the steps of:

detecting the tilt angle of the carrier;

detecting the height of the carrier;

detecting the weight of an object on the carrier; and estimating the location of the center of gravity in the fore-and-aft direction of the vehicle based on the detected tilt angle, height and weight.

* * * * *